United States Patent
Bregler et al.

(10) Patent No.: US 10,776,330 B2
(45) Date of Patent: Sep. 15, 2020

(54) OPTIMIZED RE-DEPLOYMENT OF DATABASE ARTIFACTS

(71) Applicant: SAP SE, Walldorf (DE)

(72) Inventors: Jonathan Bregler, Kraichtal (DE); Alexander Bunte, Heidelberg (DE); Arne Harren, Walldorf (DE); Andreas Kellner, Birkenau-Löhrbach (DE); Daniel Kuntze, Bruchsal (DE); Simon Lueders, Walldorf (DE); Volker Sauermann, Dossenheim (DE); Michael Schnaubelt, Leimen (DE); Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 15/637,554

(22) Filed: Jun. 29, 2017

(65) Prior Publication Data
US 2019/0005074 A1    Jan. 3, 2019

(51) Int. Cl.
*G06F 17/00* (2019.01)
*G06F 16/21* (2019.01)
*G06F 16/901* (2019.01)

(52) U.S. Cl.
CPC ........ *G06F 16/217* (2019.01); *G06F 16/9024* (2019.01)

(58) Field of Classification Search
CPC .... G06F 16/9024; G06F 16/248; G06F 16/21; G06F 16/2365; G06F 16/217; G06F 16/2471
See application file for complete search history.

(56) References Cited

U.S. PATENT DOCUMENTS

| | | | |
|---|---|---|---|
| 7,124,148 B2 | 10/2006 | Sauermann | |
| 7,222,308 B2 | 5/2007 | Sauermann et al. | |
| 7,231,387 B2 | 6/2007 | Sauermann et al. | |
| 7,257,599 B2 | 8/2007 | Sauermann et al. | |
| 7,310,719 B2 | 12/2007 | Von Bergen et al. | |
| 7,337,295 B2 | 2/2008 | Von Bergen et al. | |
| 7,373,340 B2 | 5/2008 | Sauermann et al. | |
| 7,403,495 B2 | 7/2008 | Sauermann | |
| 7,415,458 B2 | 8/2008 | Sauermann | |
| 7,447,987 B2 | 11/2008 | Sauermann | |
| 7,454,454 B2 | 11/2008 | Sauermann | |
| 7,487,165 B2 | 2/2009 | Sauermann et al. | |
| 7,574,676 B2 | 8/2009 | Sauermann | |
| 7,590,683 B2 | 9/2009 | Bergen et al. | |
| 7,610,582 B2 | 10/2009 | Becker et al. | |
| 7,647,592 B2 | 1/2010 | Sauermann | |

(Continued)

OTHER PUBLICATIONS

U.S. Appl. No. 15/824,041, Bregler et al., filed Nov. 28, 2017.

(Continued)

*Primary Examiner* — Truong V Vo
(74) *Attorney, Agent, or Firm* — Fish & Richardson P.C.

(57) ABSTRACT

Whether database objects corresponding to an artifact to deploy already exists in a database is determined. Depending artifacts are calculated using a prior-generated dependency graph. Whether any database objects corresponding to the calculated depending artifacts need to be redeployed are determined. Whether a build plugin corresponding to the database objects needing to be redeployed supports a redeployment option is determined. The artifacts are processed according to an execution graph.

21 Claims, 7 Drawing Sheets

(56) References Cited

U.S. PATENT DOCUMENTS

| | | |
|---|---|---|
| 7,653,452 B2 | 1/2010 | Sauermann et al. |
| 7,664,858 B2 | 2/2010 | Sauermann |
| 7,665,030 B2 | 2/2010 | Sauermann et al. |
| 7,685,510 B2 | 3/2010 | Sauermann |
| 7,725,900 B2 | 5/2010 | Sauermann |
| 7,730,053 B2 | 6/2010 | Sauermann |
| 7,752,628 B2 | 7/2010 | Sauermann |
| 7,797,286 B2 | 9/2010 | Sauermann |
| 7,873,666 B2 | 1/2011 | Sauermann |
| 7,900,155 B2 | 3/2011 | Sauermann |
| 8,074,206 B2 | 12/2011 | Sauermann et al. |
| 8,078,985 B2 | 12/2011 | Sauermann |
| 8,108,798 B2 | 1/2012 | Sauermann |
| 8,171,422 B2 | 5/2012 | Sauermann |
| 8,203,972 B2 | 6/2012 | Sauermann |
| 8,224,938 B2 | 7/2012 | Sauermann |
| 8,510,710 B2 | 8/2013 | Harren et al. |
| 8,621,385 B2 | 12/2013 | Sauermann et al. |
| 9,026,525 B2 | 5/2015 | Harren et al. |
| 9,026,857 B2 | 5/2015 | Becker et al. |
| 9,047,105 B2 | 6/2015 | Kinder et al. |
| 9,069,832 B2 | 6/2015 | Becker et al. |
| 9,411,707 B1 | 8/2016 | Hale et al. |
| 9,600,269 B1 | 3/2017 | Bregler et al. |
| 2004/0220893 A1 | 11/2004 | Spivack et al. |
| 2005/0044110 A1* | 2/2005 | Herzenberg ........... G16B 50/00 |
| 2005/0055331 A1 | 3/2005 | Sauermann et al. |
| 2009/0043796 A1 | 2/2009 | Sauermann |
| 2009/0265314 A1 | 10/2009 | Kindsvogel et al. |
| 2010/0082549 A1 | 4/2010 | Hollingsworth et al. |
| 2011/0054266 A1* | 3/2011 | Dinino ..................... A61B 8/00 |
| | | 600/300 |
| 2013/0031165 A1 | 1/2013 | Pantos et al. |
| 2014/0215385 A1 | 7/2014 | Sauermann |
| 2015/0106736 A1 | 4/2015 | Torman et al. |
| 2016/0072817 A1 | 3/2016 | Makhervaks et al. |
| 2016/0085841 A1 | 3/2016 | Dorfman et al. |
| 2016/0182315 A1 | 6/2016 | Salokanto et al. |
| 2016/0294881 A1 | 10/2016 | Hua et al. |
| 2017/0177892 A1 | 6/2017 | Tingstrom et al. |
| 2017/0322991 A1* | 11/2017 | Tran ..................... G06F 16/258 |
| 2017/0323112 A1 | 11/2017 | Tran et al. |
| 2018/0095739 A1 | 4/2018 | Baset et al. |
| 2018/0097725 A1 | 4/2018 | Wood et al. |
| 2019/0005108 A1 | 1/2019 | Bregler et al. |
| 2019/0007895 A1 | 1/2019 | Bregler et al. |
| 2019/0163772 A1 | 5/2019 | Bregler et al. |
| 2019/0005054 A1 | 10/2019 | Bregler et al. |

OTHER PUBLICATIONS

Non-Final Office Action issued in U.S. Appl. No. 15/637,698 dated Mar. 7, 2019, 12 pages.

Non-Final Office Action issued in U.S. Appl. No. 15/637,531 dated May 9, 2019, 42 pages.

Non-final office action issued in U.S. Appl. No. 15/637,698 dated Aug. 26, 2019, 14 pages.

Final office action issued in U.S. Appl. No. 15/637,531 dated Nov. 29, 2019, 19 pages.

Non-final office action issued in U.S. Appl. No. 15/637,601 dated May 7, 2020, 41 pages.

Non-Final Office Action issued in U.S. Appl. No. 15/637,531 dated Jun. 2, 2020, 26 pages.

* cited by examiner

OPTIMIZED RE-DEPLOYMENT OF DATABASE ARTIFACTS

CROSS REFERENCE TO RELATED APPLICATIONS

This application is related to and filed in conjunction with U.S. patent application Ser. No. 15/637,531, filed on Jun. 30, 2017, entitled "DATABASE-LEVEL CONTAINER GROUP MANAGEMENT"; which is also related to and filed in conjunction with U.S. patent application Ser. No. 15/637,601, filed on Jun. 30, 2017, entitled "DEPLOYMENT OF INDEPENDENT DATABASE ARTIFACT GROUPS", which is also related to and filed in conjunction with U.S. patent application Ser. No. 15/637,698, filed on Jun. 30, 2017, entitled "RESTRICTING ACCESS TO EXTERNAL SCHEMAS FROM WITHIN A DATABASE LEVEL CONTAINER BY WHITELISTING ALLOWED SCHEMAS", the entire contents of each application and together are hereby incorporated by reference.

BACKGROUND

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure (HANA DI) is a service layer of the HANA database that simplifies the deployment of HANA database objects by providing a declarative approach for defining database objects (as design-time artifacts) and ensuring a consistent deployment into the database, based on a transactional all-or-nothing deployment model and implicit dependency management. HANA DI is focused only on deployment aspects and addresses both development and modeling scenarios as part of the HANA database.

Upon the deployment of a HANA DI artifact, HANA DI will automatically calculate all dependent and already deployed database objects in order to re-deploy them to achieve a consistent target state. In some instances, re-deployment can result in execution of unnecessary or non-optimum operations which can adversely affect application development and installation times, application runtime, CPU load, and database traffic.

SUMMARY

The present disclosure describes database object re-deployment optimization.

In an implementation, whether database objects corresponding to an artifact to deploy already exists in a database is determined. Depending artifacts are calculated using a prior-generated dependency graph. Whether any database objects corresponding to the calculated depending artifacts need to be redeployed are determined. Whether a build plugin corresponding to the database objects needing to be redeployed supports a redeployment option is determined. The artifacts are processed according to an execution graph.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, if a database object is still valid, the described methodology prevents recreation (that is, deleting and newly creating) of the database object during re-deployment. Avoidance of unnecessary recreation can save runtime and CPU load, as well as reducing traffic on the database. Second, avoidance of unnecessary recreation can speed up deployment processes. For example, in complex scenarios, the deployment of database artifacts can lead to the re-deployment of hundreds or thousands of existing database objects, many of which may be re-deployed unnecessarily. Third, the described methodology can speed up turnaround times for development activities and application installation times. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes database object re-deployment optimization, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

For purposes of understanding, this disclosure is focused on discussion of the described methodology and subject matter with respect to the HANA platform. However, the described methodology and subject matter is also applicable to conventional- and hybrid-type database platforms, and discussion related to the HANA platform is not meant to limit the disclosure or scope of the described subject matter in any way, or to limit applicability to other database platforms.

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure (HANA DI) is a service layer on top of the HANA database that simplifies the deployment of HANA database objects by providing a declarative approach for defining a database object (as a design-time database artifact (or "artifact")) and ensuring a consistent deployment into the database, based on a transactional all-or-nothing deployment model and implicit dependency management. In typical implementations, for creating, modifying, and deleting objects inside the database, HANA DI uses SQL commands. HANA DI is configured to run inside its own process as part of a HANA database cluster (for example, one process per logical database).

HANA DI is focused only on deployment/re-deployment aspects and addresses both development and modeling scenarios as part of the HANA database. In typical implementations, non-deployment aspects (for example, version control and lifecycle management) are not handled by HANA DI, but in both the cloud and on premise as part of overall development and deployment architecture and infrastructure. As will be appreciated by those of ordinary skill in the art, in some implementations, the HANA DI can be configured to implement, manage, trigger, or execute some or all non-deployment aspects.

Upon the deployment of a HANA DI artifact, HANA DI will automatically calculate all dependent and already deployed database objects in order to re-deploy them to achieve a consistent target state. In some instances, re-deployment can result in execution of unnecessary or non-optimum operations (for example, re-deploying artifacts which have not changed) which can adversely affect application development and installation times, application runtime, CPU load, and database traffic. As a first example, a conventional, non-optimized "UNDEPLOY-DEPLOY" strategy is presented. In the first example, assume a database view V selecting columns A and B from a table T already deployed on the database (that is, view V depends on table T). If an additional column C is added to table T), dropping and recreating view V is non-optimal as only a new column (C) had been added to table T.

In typical implementations, HANA DI provides artifacts for HANA database objects (for example, tables, views, calculation views, procedures, and core data services (CDS)). Non-database artifacts (for example, JAVASCRIPT programs and Open Data Protocol (ODATA)) are handled by application containers. Deployment of database objects using HANA DI is based on a container model where each container corresponds to a database schema.

Development of a HANA database persistence or compute logic is not only about sending SQL CREATE statements to the database, it's more about writing or modeling a networked set of persistence objects (for example, tables, sequences, views, procedures, functions, and data flows). Putting these objects into file-based artifacts simplifies a dependency-based deployment, un-deployment, and re-deployment, and facilitates lifecycle management aspects (for example, transports). Additionally, not all artifacts must have a 1:1 relationship to a SQL statement (for example, graphical calculation views split up into multiple database objects and table data might be provided using CSV text files or even binary files which do not correspond to SQL).

File-based artifacts also allow separating the two steps of: 1) uploading the artifacts into the HANA DI (staging) and 2) deploying the artifacts. File-based artifacts also simplify incremental deployment scenarios where only modified files are uploaded. The file-based artifacts represent the target state of the database objects (for example, they specify a view definition in a declarative way instead of imperative CREATE, ALTER, and DROP statements).

The HANA DI extracts the set of provided and required database (runtime) objects from the file-based artifacts and uses this information for dependency management during deployment (for example, to calculate an order in which the database objects need to be created, and to detect missing, required objects). Additionally, dependencies are used to re-deploy database objects that are affected by newly deployed objects.

The HANA DI is configured to use database mechanisms to ensure a transactional all-or-nothing deployment. This means that all modifications of database objects (including Data Definition Language (DDL) and Data Manipulation Language (DML) operations and all re-deployments of affected artifacts) are performed inside a single database transaction. Explicit compensation actions in case of rollbacks are not required and are handled by the HANA database as part of the transaction management.

In typical implementations, a single deployment only operates on a single container. Here, the container boundary acts as a deployment boundary (for example, affected database objects inside other database schemata are not re-deployed and deployment does not fail if database objects inside other schemata break). In addition to schema-based containers, the HANA DI also uses database schemata to isolate its metadata (for example, to separate storage of file-based artifacts from deployed database objects).

The HANA DI provides infrastructure for all deployment aspects. The interpretation of artifacts, including the extraction of dependencies and the steps to implement a target-state-based deployment of the artifacts, is performed by HANA DI build plugins (for example, a plugin for a table artifact type and a plugin for a view artifact type). Build plugins have access to a deployment container using a SQL-based API. In this way, all commands that the build plugins need (for example, creating, altering, or dropping a database object) are configured to take database security constraints into account and to be available at the SQL layer of HANA. At a lower-level and in typical implementations, to be exposed to the design-time world using the HANA DI, SQL commands must be configured to support transactional deployment where DDL and DML statements are run inside a single database transaction in non-auto-commit mode.

Deployment-related activities (for example, staging of files and triggering a deployment into a single container) are typically performed by a dedicated technical deployment user. Therefore, a fine-grained security control on the level of files or the HANA DI build plugins is not required, because the technical deployment user needs full control in the container. Typically, the schema owner of the container schema should be different from the technical deployment user to allow the separation of privileges for deployment and runtime access to the deployed database objects. In the case of a development or modeling scenario, fine-grained security control is performed by the development infrastructure.

Figure 1:
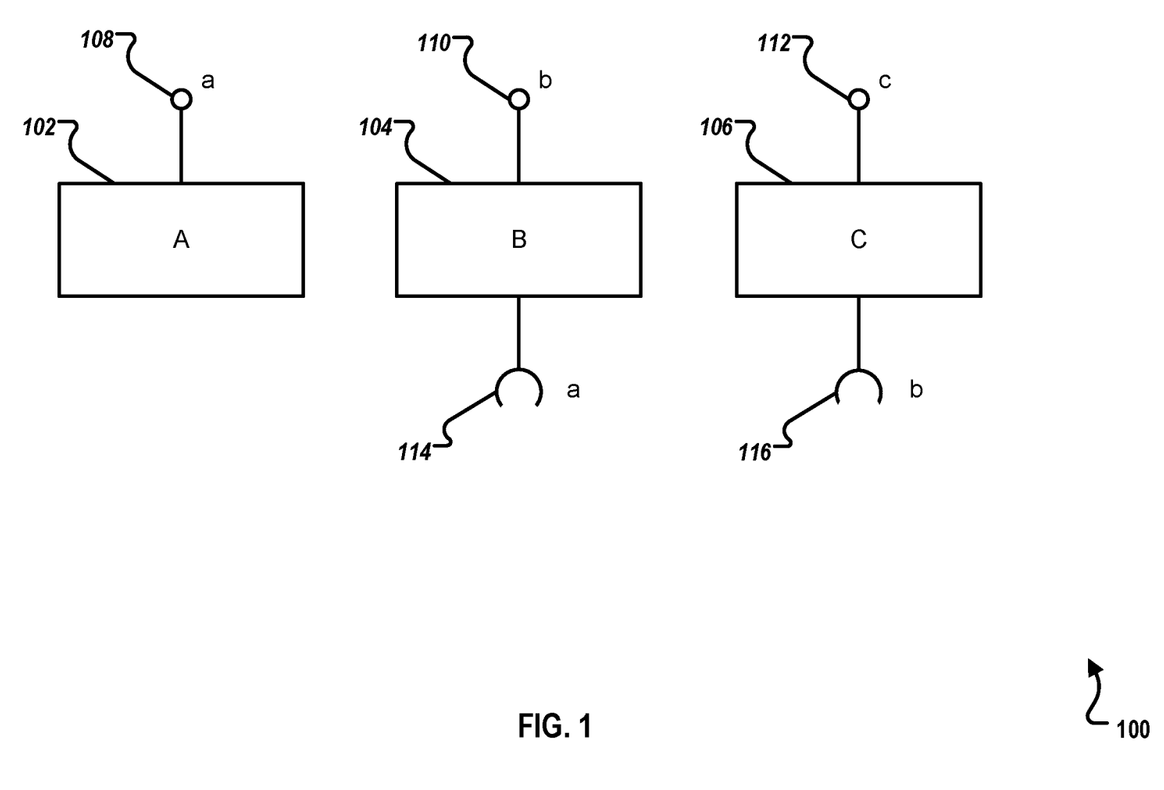
FIG. 1 is a block diagram illustrating example database artifacts and required database objects, according to an implementation.
Figure 2:
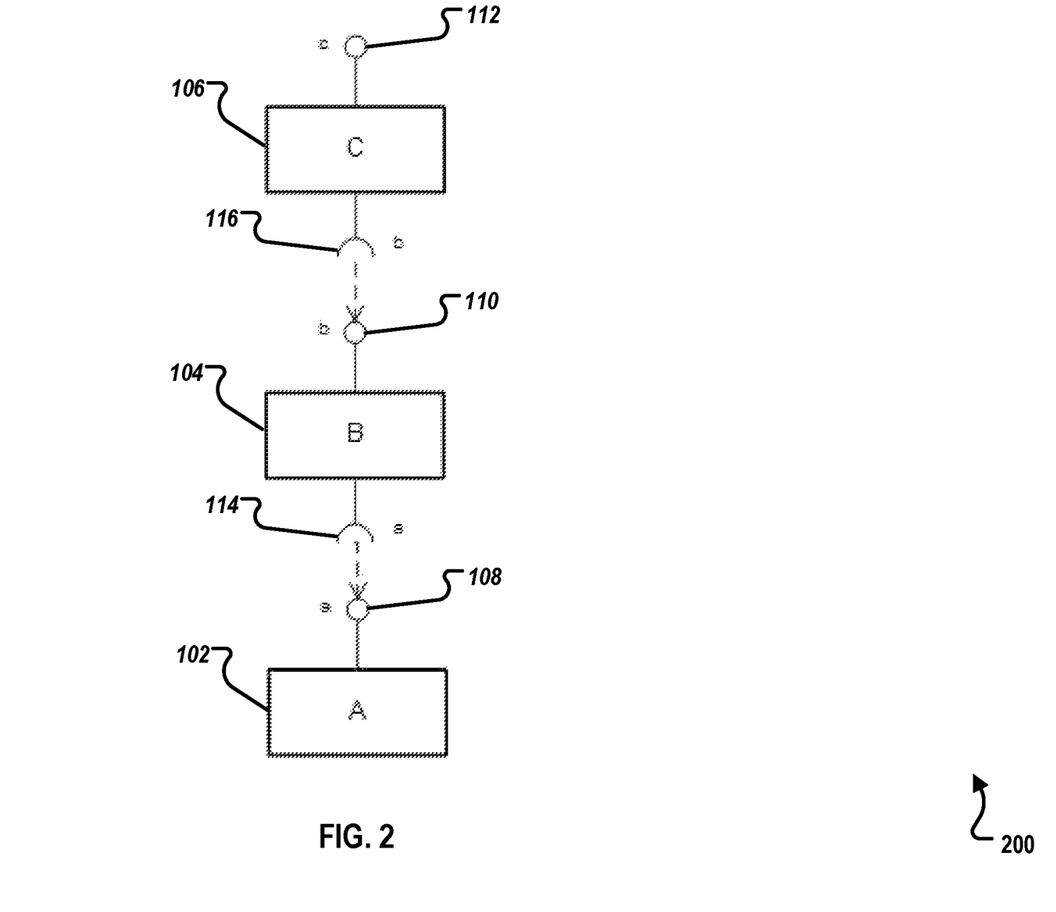
FIG. 2 is a dependency graph illustrating dependencies between the example database artifacts and required database objects of FIG. 1, according to an implementation.
Figure 3:
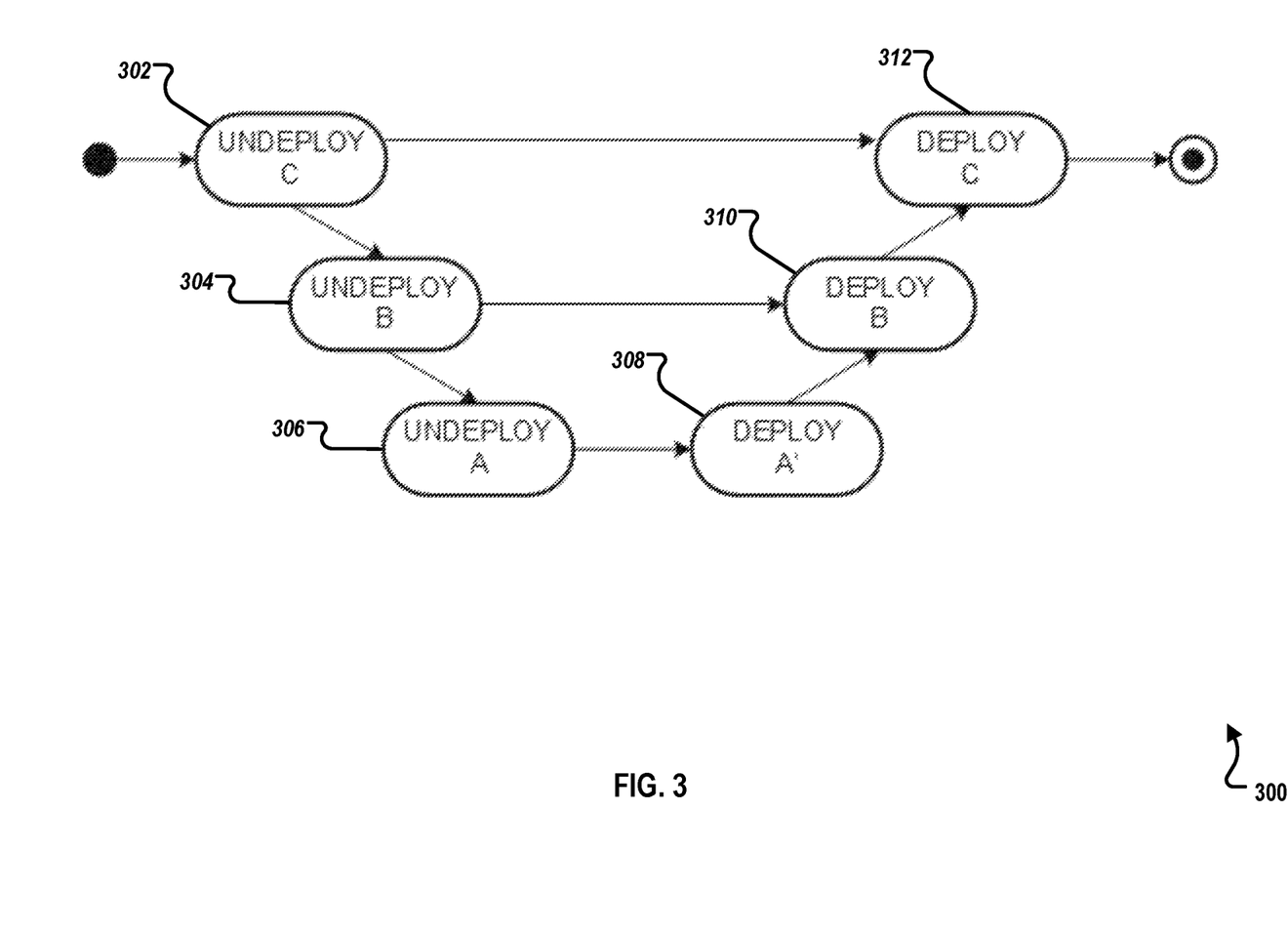
FIG. 3 is a block diagram illustrating a deployment graph for a conventional re-deployment of example database artifacts A, B, and C of FIGS. 1-2, according to an implementation.

The deployment order of artifacts is driven by the information about the database runtime objects which are provided by an artifact and which are required by an artifact. Based on this information, a dependency graph is created that connects the object providers to the corresponding object consumers. FIGS. 1-3 present a second example of a conventional, non-optimized re-deployment strategy.

FIG. 1 is a block diagram 100 illustrating example database artifacts and required database objects, according to an implementation. An artifact, or file (or more precisely, a design-time artifact) is a file on the filesystem containing an actual definition of a database object to be deployed (for example, the definition of a database table: TABLE MY_TAB (COL_1 INTEGER, COL_2 VARCHAR(10))). An object (or more precisely, a database object or a runtime object) is an actual database object in the database (for example, a database table). When a file is deployed containing a database table definition, with the HANA DI, an actual database table is created on the database. Here, it can be said that a file provided a table.

Illustrated are artifacts A 102, B 104, and C 106. As configured, artifact A 102 provides an object a 108, artifact B 104 provides object b 110, and artifact C 106 provides object c 112. Artifact B 104 requires object a (see 114), and artifact C requires objects b (see 116). Artifact A 102 depends on no other artifact.

Note that the three artifacts could have the same artifact type (A=B=C), or three different types (A≠B≠C and A≠C— as the ≠ is not transitive), or two different types (A=B≠C, A≠B=C, A=C≠B). All artifact types could be handled by the same build plugin or different build plugins.

Turning to FIG. 2, FIG. 2 is a dependency graph 200 illustrating dependencies between the example database artifacts and the required database objects of FIG. 1, according to an implementation. As illustrated, artifact C 106 depends on artifact B 104 (requires object b 110) and artifact B 104 depends on artifact A 102 (requires object a 108). As previously explained, artifact A 102 depends on no other artifact. Based on the illustrated dependencies, to deploy these artifacts, artifact A 102 is deployed, then artifact B 104, and finally artifact C 106.

FIG. 3 is a block diagram illustrating a deployment graph 300 for a conventional re-deployment of example database artifacts A, B, and C of FIGS. 1-2 if artifact A is modified, according to an implementation. Deployment of modified artifacts (for example, artifact A 102) can be handled using two different strategies: 1) in case of a "DEPLOY" strategy, a build plugin receives a modified, new version of the artifact (here, artifact A') and can react accordingly (for example, issue ALTER statements towards the database) or 2) in the previously-mentioned "UNDEPLOY-DEPLOY" strategy, the old artifact A 102 is actually undeployed and the modified, new version of the artifact (A') is deployed. Note that the same strategies can apply to the revalidation of artifacts which happens when artifacts which provide required objects are modified (or revalidated) (such as artifact B 104).

In the illustrated example, a non-optimal UNDEPLOY-DEPLOY strategy is followed for all artifacts. Since artifact A 102 has been modified, the HANA DI will automatically calculate all dependent, already deployed database objects in order to re-deploy them to achieve a consistent target state. Based on the dependencies illustrated in FIGS. 1-2, the process proceeds to undeploy C 302, undeploy B 304, and undeploy A 306. Then the artifacts are re-deployed from modified artifact A 102 (A') to C 106 as artifact C 106 requires artifact B 104 which requires artifact A 102. As illustrated in deployment graph 300, deploy A' 308 is performed to re-deploy the modified artifact A 102 (A') and is followed by deploy B 310 and deploy C 312 to re-deploy unmodified artifacts B 104 and C 106, respectively.

Figure 4A:
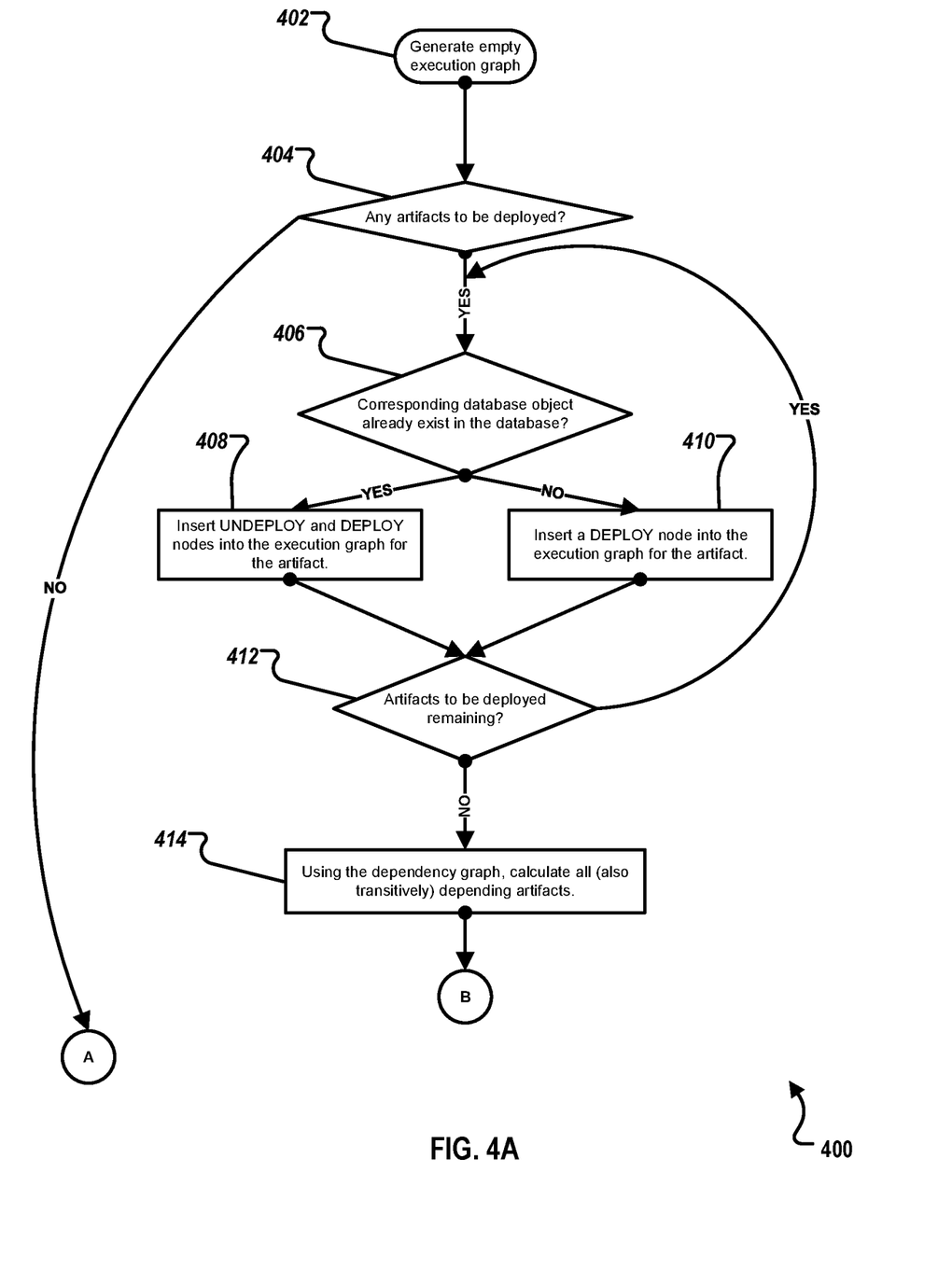
FIGS. 4A-4B represent a flow chart illustrating an example method for optimization of database object re-deployment, according to an implementation.
Figure 4B:
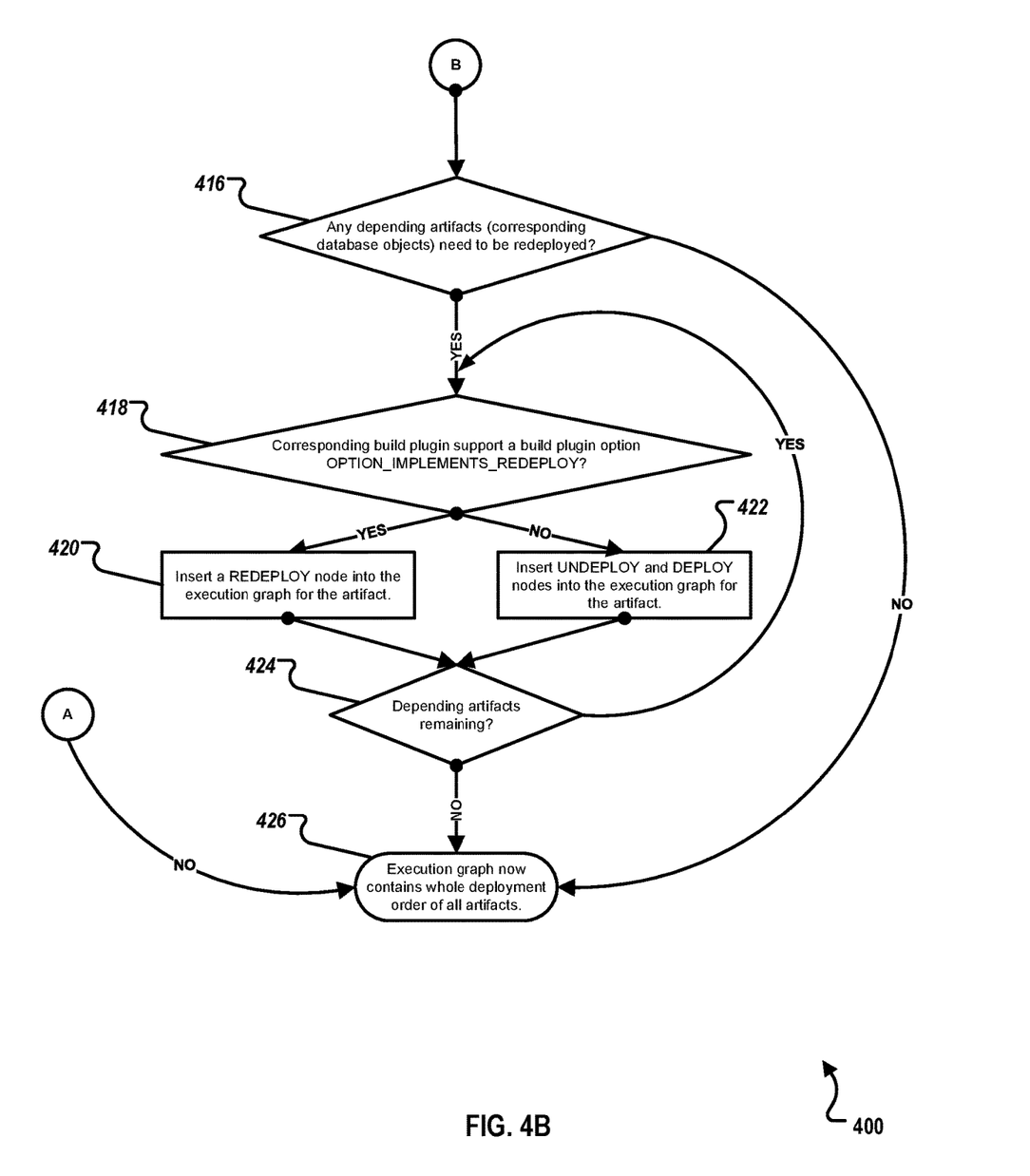

FIGS. 4A-4B represent a flow chart illustrating an example method 400 for optimization of database object re-deployment, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

Figure 5:
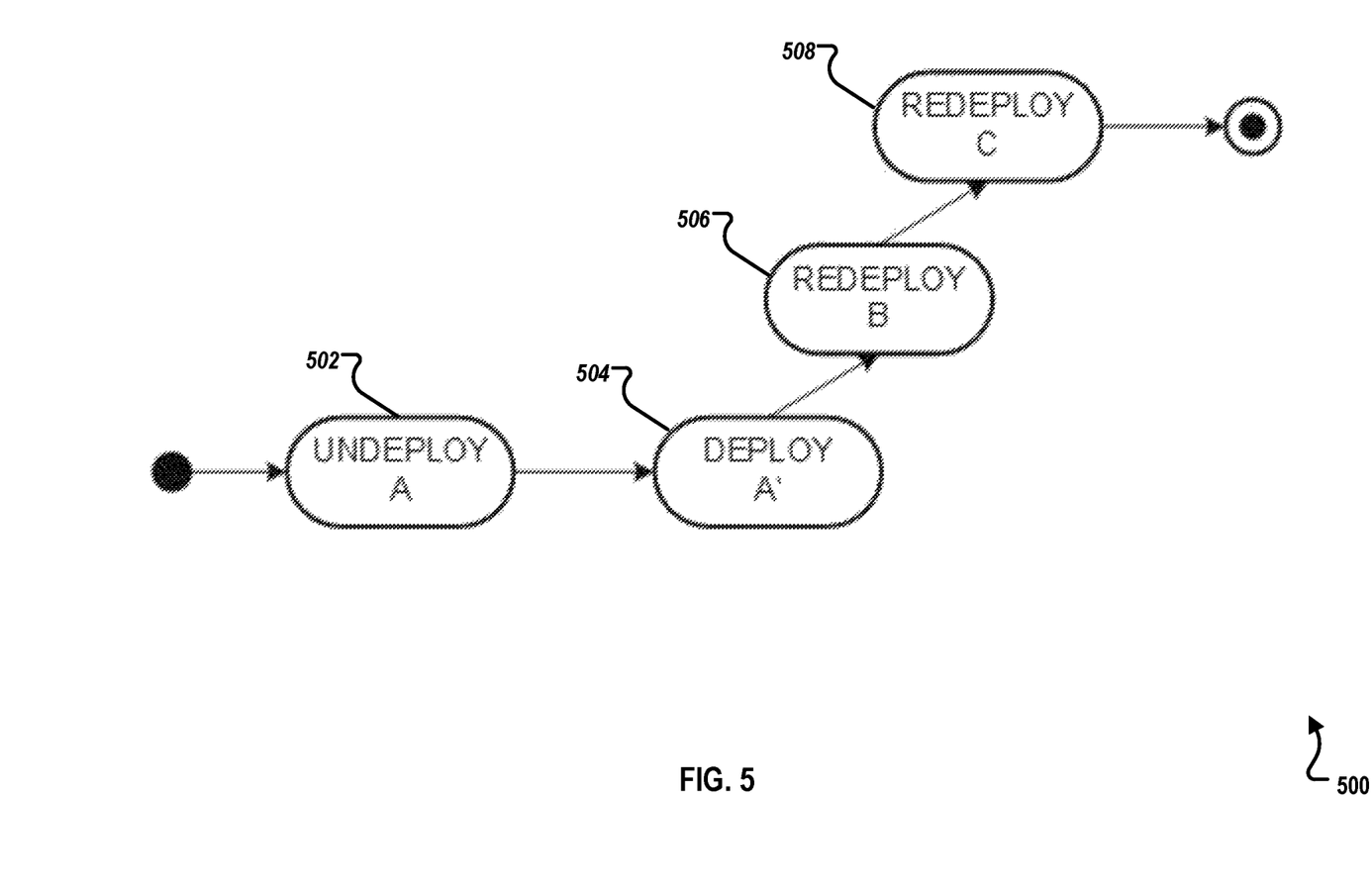
FIG. 5 is a block diagram illustrating a deployment graph for an optimized re-deployment of example database artifacts A, B, and C, according to an implementation.

In the particular example of FIGS. 1-3, re-deployment is non-optimal, at least because artifacts B 104 and C 106 are both undeployed and redeployed unnecessarily. These operations can adversely affect one or more of application development and installation times, application runtime, CPU load, and database traffic. For example, some versions of the HANA database do not allow an intermediate state for each of its metadata objects, with its validity flag not fully determined. Therefore, each DDL statement triggers a nested revalidation on all its dependent objects to determine their validity. Moreover, any object with two or more dependent objects would cost its entire revalidation process for each time its base object is revalidated. These repeated revalidations on several dependent objects costs a large amount of time during the execution of the set of DDL statements. FIGS. 4-5 present an optimized version of example of the conventional, non-optimized re-deployment strategy presented in FIGS. 1-3.

Re-deployment can be optimized by determining if such a drop-create behavior is necessary. A particular feature of the HANA database can be used to make this determination. For each database object (for example, tables, views, and sequences), there are separate views or tables containing its associated metadata (for example, M_TABLES, M_VIEWS, and M_SEQUENCES, respectively). In those metadata views or tables, a dedicated IS_VALID column indicates whether a corresponding database object is still valid. Here, the IS_VALID indicator is employed to determine if an explicit drop and create of a specific database object to be re-deployed can be skipped.

For example, continuing from the first example above, assume view V selects column A and B from table T. If table T is deployed anew with a modified table artifact T', adding an additional column C to table T, the IS_VALID indicator of view V will show that view V is still valid (for example, by returning TRUE, as the additional column C does not affect view V, which only selects columns A and B from table T). In this case, we may skip the drop-create of view V (that is, for the re-deployment of view V, there are no further steps to be executed). However, if table T is deployed anew with a modified table artifact T" that removes column B from table T, the IS_VALID indicator will show that view V is considered invalid (for example, by returning FALSE), as view V selects from a column (B) in table T that no longer exists.

In some instances, a database object may be explicitly dropped and created although it is still valid as indicated by the IS_VALID column. In the first example above, the SELECT STAR view V selects all column from table T using the wildcard "*." SELECT STAR views are implemented in the HANA database by explicitly persisting the actual column names (here, the columns A and B). When table T is deployed anew with a modified table artifact T' (for example, an additional column C is added to table T), view V would be still valid. However, the newly added column C would not be visible using view V as its list of column names is not updated. Therefore, when HANA DI encounters a SELECT STAR view for re-deployment, typical behavior is to explicitly drop and create the view anew.

From an implementation point-of-view, each build plugin supporting re-deployment optimizations for its corresponding database object needs to implement a:
  build plugin option (OPTION_IMPLEMENTS_REDEPLOY), and
  getObjectStatus( . . . ) method, which queries the corresponding database metadata view or table to check for the IS_VALID indicator.
When creating the deployment graph (for example, refer to FIG. 5) prior to the actual deployment of artifacts, the HANA DI checks each build plugin for the build plugin option OPTION_IMPLEMENTS_REDEPLOY. When the build plugin option is not set, DEPLOY and UNDEPLOY nodes will be inserted into the deployment graph as it would be without this invention. However, if the build plugin option is set, only a REDEPLOY node will be inserted into the graph.

A deploy, as at 504, creates the object A' anew in the database. Redeploys, as at 506/508, call the method getObjectStatus( . . . ) to query the IS_VALID indicator on the database. This SELECT call is much faster than undeploying and deploying the corresponding unmodified objects B and C. Additionally, undeploying the object B would cause a whole cascade of invalidations of all objects (directly or indirectly) depending on B. Deploying the object B anew would then trigger a cascade of revalidations of all objects (directly or indirectly) depending on B. These steps would be both unnecessary and computationally very expensive, depending on the amount and types of dependent objects.

Referring to FIG. 4A, at 402, an empty execution graph is generated. The empty execution graph is associated with a prior-generated dependency graph (for example, as illustrated in FIG. 2). In method 400, an execution graph is populated (for example, as illustrated in FIG. 3, based on the prior-generated dependency graph). From 402, method 400 proceeds to 404.

At 404, a determination is made whether there are one or more artifacts to deploy. If it is determined that there are no artifacts to deploy, method 400 proceeds to 426 in FIG. 4B. If it is determined that there are artifacts to deploy, method 400 proceeds to 406.

At 406, a determination is made whether a corresponding database object already exists in the database. If it is determined that a corresponding database object already exists in the database, method 400 proceeds to 408. If it is determined a corresponding database object does not already exists in the database, method 400 proceeds to 410.

At 408, UNDEPLOY and DEPLOY nodes are inserted into the execution graph for the artifact. From 408, method 400 proceeds to 412.

At 410, a DEPLOY node is inserted into the execution graph for the artifact. From 410, method 400 proceeds to 412.

At 412, a determination is made whether there are any artifacts remaining to be deployed. If it is determined that there are artifacts remaining to be deployed, method 400 proceeds back to 406. If it is determined there are no artifacts remaining to be deployed, method 400 proceeds to 414.

At 414, using the prior-generated dependency graph, depending artifacts are calculated (including transitively). From 414, method 400 proceeds to 416 in FIG. 4B.

At 416, a determination is made whether there are any depending artifacts (corresponding database objects) that need to be redeployed. If it is determined that there are no depending artifacts, method 400 proceeds to 426. If it is determined there are depending artifacts, method 400 proceeds to 418.

At 418, a determination is made as to whether a corresponding build plug-in (associated with the corresponding database objects) supports a build plugin option (OPTION_IMPLEMENTS_REDEPLOY). If it is determined that the build plug-in supports the build plugin option, method 400 proceeds to 420. Otherwise, if it is determined that the build plug-in does not support the build plugin option, method 400 proceeds to 422.

At 420, a REDEPLOY node is inserted into the execution graph for the artifact. From 420, method 400 proceeds to 424.

At 422, UNDEPLOY and DEPLOY nodes are inserted into the execution graph for the artifact. From 422, method 400 proceeds to 424.

At 424, a determination is made whether there are any depending artifacts remaining. If it is determined that there are no depending artifacts, method 400 proceeds to 426. If it is determined there are depending artifacts, method 400 proceeds back to 418.

At 426, the execution graph is considered to contain the entire deployment order of all artifacts. Artifacts are processed according to the execution graph. After 426, method 400 stops.

Note, at 426, when an inserted REDEPLOY node is encountered during the actual deployment process, the validity of the current database object to be re-deployed is checked using the previously-described getObjectStatus ( . . . ) method:
  If the database object is still valid, nothing needs to be done.
  If the database object is invalid, explicitly drop and create the database object to fetch the error message as the deployment would have left the database in an inconsistent state. Referring to the previously described first example (modified artifact table T"), removing column B from table T would lead to an inconsistent state as view V still selects both columns A and B from table T.
  There may be erroneous cases (for example, the IS_VALID indicator is erroneous and falsely indicates that the corresponding database object is invalid) where explicitly dropping and creating an invalid database object succeeds. In a case where IS_VALID=FALSE, the invalid database object is explicitly dropped and recreated. If successful, a warning (for example, a message, log entry, or graphical dialog) is issued that an invalid database object has successfully been recreated. If unsuccessful, an error message is issued and reported by the database.

There may also be cases where the database object to be re-deployed does not exist at the time of re-deployment. For example, a user may have manually dropped database objects instead of using the HANA DI to drop them. However, according to an associated dependency graph (created along with former deployments), the objects are still regarding as existing. Here, a deployment is attempted for the artifact corresponding to the non-existing database object. If the deployment of the database object is successful, the deployment process is continued. Otherwise, if the deployment of the database object is not successful, the deployment process is aborted.

Turning to FIG. 5, FIG. 5 is a block diagram illustrating a deployment graph 500 for an optimized re-deployment of example database artifacts A, B, and C, according to an implementation. In the illustrated example, the optimized re-deploy strategy of FIGS. 4A-4B is followed for all artifacts. Based on method 400, the optimized process proceeds to undeploy artifact A 502 as artifact A 102 has been modified (A'). Note that artifact B 104 and artifact C 106 are not initially undeployed as in FIG. 3. Artifact A' is deployed at 504. Re-deployment at 506 and 508 is checking the corresponding IS_VALID flag and doing nothing else (that is, no dropping or recreating of database objects).

Figure 6:
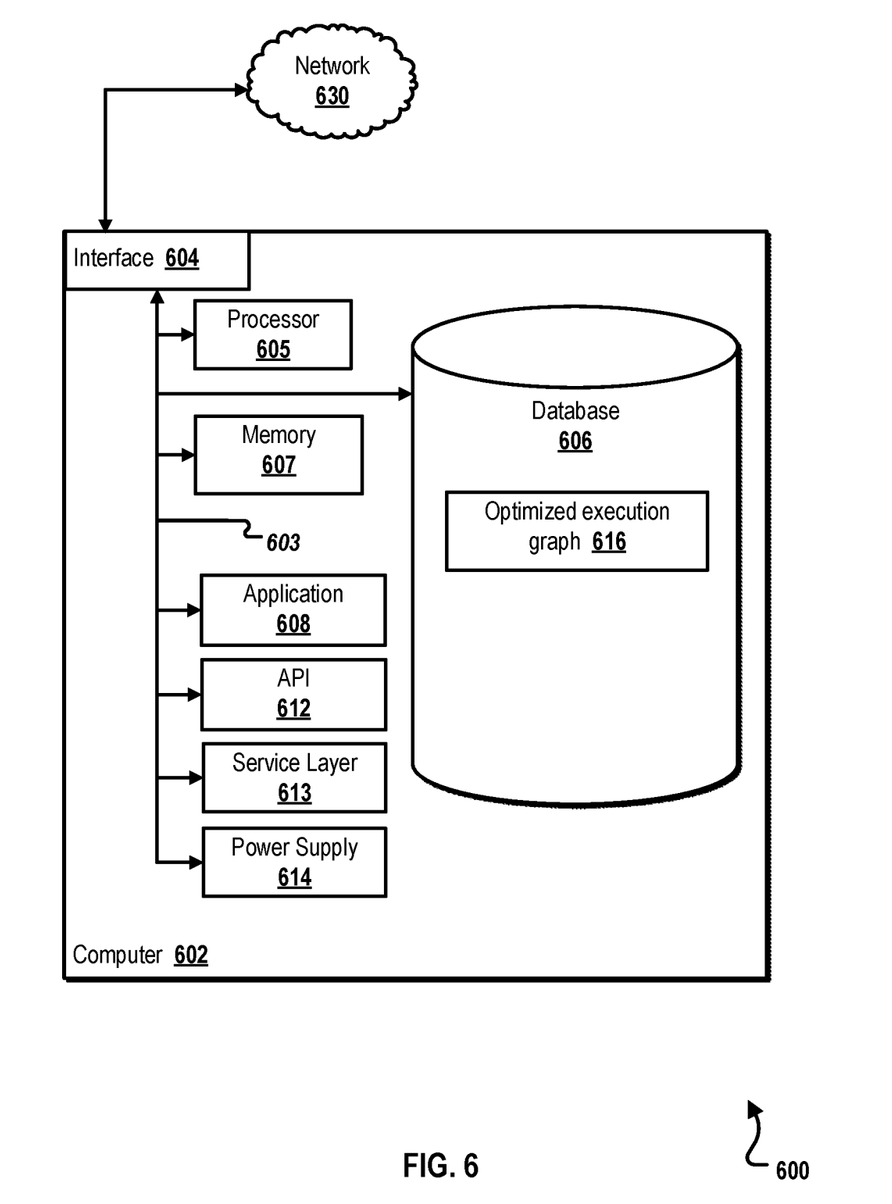
FIG. 6 is a block diagram illustrating an example computer system used to provide computational functionalities associated with described algorithms, methods, functions, processes, flows, and procedures as described in the instant disclosure, according to an implementation.

FIG. 6 is a block diagram of an example computer system 600 used to provide computational functionalities associated with described algorithms, methods, functions, processes, flows, and procedures, as described in the instant disclosure, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds an instance of the previously described optimized execution graph 616.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power-supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

Described implementations of the subject matter can include one or more features, alone or in combination.

For example, in a first implementation, a computer-implemented method, comprising: determining whether database objects corresponding to an artifact to deploy already exists in a database; calculating depending artifacts using a prior-generated dependency graph; determining whether any database objects corresponding to the calculated depending artifacts need to be redeployed; determining whether a build plugin corresponding to the database objects needing to be redeployed supports a redeployment option; and processing the artifacts according to an execution graph.

The foregoing and other described implementations can each, optionally, include one or more of the following features:

A first feature, combinable with any of the following features, further comprising generating an execution graph associated with the prior-generated dependency graph.

A second feature, combinable with any of the previous or following features, further comprising inserting UNDEPLOY and DEPLOY nodes into the execution graph for the artifact or inserting a DEPLOY node into the execution graph for the artifact.

A third feature, combinable with any of the previous or following features, further comprising determining whether any artifacts are remaining to be deployed.

A fourth feature, combinable with any of the previous or following features, wherein determining the depending artifacts is performed transitively.

A fifth feature, combinable with any of the previous or following features, further comprising inserting REDEPLOY node into the execution graph for the artifact or inserting an UNDEPLOY and DEPLOY node into the execution graph for the artifact.

A sixth feature, combinable with any of the previous or following features, further comprising determining whether there are depending artifacts remaining.

In a second implementation, a non-transitory, computer-readable medium storing one or more instructions executable by a computer system to perform operations comprising: determining whether database objects corresponding to an artifact to deploy already exists in a database; calculating depending artifacts using a prior-generated dependency graph; determining whether any database objects corresponding to the calculated depending artifacts need to be redeployed; determining whether a build plugin corresponding to the database objects needing to be redeployed supports a redeployment option; and processing the artifacts according to an execution graph.

The foregoing and other described implementations can each, optionally, include one or more of the following features:

A first feature, combinable with any of the following features, further comprising one or more instructions to generate an execution graph associated with the prior-generated dependency graph.

A second feature, combinable with any of the previous or following features, further comprising one or more instructions to insert UNDEPLOY and DEPLOY nodes into the execution graph for the artifact or to insert a DEPLOY node into the execution graph for the artifact.

A third feature, combinable with any of the previous or following features, further comprising one or more instructions to determine whether any artifacts are remaining to be deployed.

A fourth feature, combinable with any of the previous or following features, wherein determining the depending artifacts is performed transitively.

A fifth feature, combinable with any of the previous or following features, further comprising one or more instructions to insert a REDEPLOY node into the execution graph for the artifact or to insert an UNDEPLOY and DEPLOY node into the execution graph for the artifact.

A sixth feature, combinable with any of the previous or following features, further comprising one or more instructions to determine whether there are depending artifacts remaining.

In a third implementation, a computer-implemented system, comprising: a computer memory; and a hardware processor interoperably coupled with the computer memory and configured to perform operations comprising: determining whether database objects corresponding to an artifact to deploy already exists in a database; calculating depending artifacts using a prior-generated dependency graph; determining whether any database objects corresponding to the calculated depending artifacts need to be redeployed; determining whether a build plugin corresponding to the database objects needing to be redeployed supports a redeployment option; and processing the artifacts according to an execution graph.

The foregoing and other described implementations can each, optionally, include one or more of the following features:

A first feature, combinable with any of the following features, further configured to generate an execution graph associated with the prior-generated dependency graph.

A second feature, combinable with any of the previous or following features, further configured to insert UNDEPLOY and DEPLOY nodes into the execution graph for the artifact or to insert a DEPLOY node into the execution graph for the artifact.

A third feature, combinable with any of the previous or following features, further configured to determine whether any artifacts are remaining to be deployed.

A fourth feature, combinable with any of the previous or following features, wherein determining the depending artifacts is performed transitively.

A fifth feature, combinable with any of the previous or following features, further configured to insert a REDEPLOY node into the execution graph for the artifact or to insert an UNDEPLOY and DEPLOY node into the execution graph for the artifact.

A sixth feature, combinable with any of the previous or following features, further configured to determine whether there are depending artifacts remaining.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for minimizing redeployment, the method being executed using one or more processors and comprising:
    determining, by the one or more processors, whether database objects corresponding to an artifact to deploy already exist in a database;
    calculating, by the one or more processors, depending artifacts using a prior-generated dependency graph;
    processing, by the one or more processors, metadata of each of the database objects in an execution graph that is populated based on the prior-generated dependency graph to determine a validity status of each of the database objects, the validity status comprising an invalidity or a validity that is indicative of that a drop and create protocol is skippable relative to a visibility of each of the database objects in the execution graph;
    determining, by the one or more processors, that a first database object of a plurality of database objects corresponding to the depending artifacts needs to be redeployed based on the invalidity of the first database object;
    determining, by the one or more processors, that the drop and create protocol of a second database object of the plurality of database objects is skippable based on the validity of the second database object;
    determining, by the one or more processors, whether a build plugin corresponding to the first database object needing to be redeployed supports a redeployment option comprising a verification of the validity of the first database object needing to be redeployed; and
    processing, by the one or more processors, the depending artifacts according to the execution graph.

2. The computer-implemented method of claim 1, further comprising generating the execution graph associated with the prior-generated dependency graph.

3. The computer-implemented method of claim 1, further comprising inserting UNDEPLOY and DEPLOY nodes into the execution graph for the artifact or inserting a DEPLOY node into the execution graph for the artifact.

4. The computer-implemented method of claim 1, further comprising determining whether any artifacts are remaining to be deployed.

5. The computer-implemented method of claim 1, wherein determining the depending artifacts is performed transitively.

6. The computer-implemented method of claim 1, further comprising inserting REDEPLOY node into the execution graph for the artifact or inserting an UNDEPLOY and DEPLOY node into the execution graph for the artifact.

7. The computer-implemented method of claim 1, further comprising determining whether there are remaining depending artifacts.

8. A non-transitory, computer-readable medium storing one or more instructions executable by a computer system to perform operations comprising:
    determining whether database objects corresponding to an artifact to deploy already exist in a database;
    calculating depending artifacts using a prior-generated dependency graph;
    processing metadata of each of the database objects in an execution graph that is populated based on the prior-generated dependency graph to determine a validity status of each of the database objects, the validity status comprising an invalidity or a validity that is indicative of that a drop and create protocol is skippable relative to a visibility of each of the database objects in the execution graph;
    determining that a first database object of a plurality of database objects corresponding to the depending artifacts needs to be redeployed based on the invalidity of the first database object;
    determining that the drop and create protocol of a second database object of the plurality of database objects is skippable based on the validity of the second database object;
    determining whether a build plugin corresponding to the first database object needing to be redeployed supports a redeployment option comprising a verification of the validity of the first database object needing to be redeployed; and
    processing the depending artifacts according to the an execution graph.

9. The non-transitory, computer-readable medium of claim 8, further comprising one or more instructions to generate the execution graph associated with the prior-generated dependency graph.

10. The non-transitory, computer-readable medium of claim 8, further comprising one or more instructions to insert UNDEPLOY and DEPLOY nodes into the execution graph for the artifact or to insert a DEPLOY node into the execution graph for the artifact.

11. The non-transitory, computer-readable medium of claim 8, further comprising one or more instructions to determine whether any artifacts are remaining to be deployed.

12. The non-transitory, computer-readable medium of claim 8, wherein determining the depending artifacts is performed transitively.

13. The non-transitory, computer-readable medium of claim 8, further comprising one or more instructions to insert a REDEPLOY node into the execution graph for the artifact or to insert an UNDEPLOY and DEPLOY node into the execution graph for the artifact.

14. The non-transitory, computer-readable medium of claim 8, further comprising one or more instructions to determine whether there are remaining depending artifacts.

15. A computer-implemented system, comprising:
a computer memory; and
a hardware processor interoperably coupled with the computer memory and configured to perform operations comprising:
determining whether database objects corresponding to an artifact to deploy already exist in a database,
calculating depending artifacts using a prior-generated dependency graph,
processing metadata of each of the database objects in an execution graph that is populated based on the prior-generated dependency graph to determine a validity status of each of the database objects, the validity status comprising an invalidity or a validity that is indicative of that a drop and create protocol is skippable relative to a visibility of each of the database objects in the execution graph,
determining that a first database object of a plurality of database objects corresponding to the depending artifacts needs to be redeployed based on the invalidity of the first database object,
determining that the drop and create protocol of a second database object of the plurality of database objects is skippable based on the validity of the second database object,
determining whether a build plugin corresponding to the first database object needing to be redeployed supports a redeployment option comprising a verification of the validity of the first database object needing to be redeployed, and
processing the depending artifacts according to the an execution graph.

16. The computer-implemented system of claim 15, further configured to generate the execution graph associated with the prior-generated dependency graph.

17. The computer-implemented system of claim 15, further configured to insert UNDEPLOY and DEPLOY nodes into the execution graph for the artifact or to insert a DEPLOY node into the execution graph for the artifact.

18. The computer-implemented system of claim 15, further configured to determine whether any artifacts are remaining to be deployed.

19. The computer-implemented system of claim 15, wherein determining the depending artifacts is performed transitively.

20. The computer-implemented system of claim 15, further configured to insert a REDEPLOY node into the execution graph for the artifact or to insert an UNDEPLOY and DEPLOY node into the execution graph for the artifact.

21. The computer-implemented system of claim 15, further configured to determine whether there are remaining depending artifacts.

* * * * *